(12) United States Patent
Watanabe

(10) Patent No.: US 11,482,252 B2
(45) Date of Patent: Oct. 25, 2022

(54) MAGNETIC DISK INSPECTION METHOD OF MAGNETIC DISK DEVICE AND MAGNETIC DISK DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Toru Watanabe, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/468,581

(22) Filed: Sep. 7, 2021

(65) Prior Publication Data

US 2022/0122636 A1    Apr. 21, 2022

(30) Foreign Application Priority Data

Oct. 20, 2020   (JP) .............................. JP2020-176105

(51) Int. Cl.
| | |
|---|---|
| *G11B 5/00* | (2006.01) |
| *G11B 20/10* | (2006.01) |
| *G11B 19/04* | (2006.01) |
| *G11B 5/60* | (2006.01) |
| *G11B 5/455* | (2006.01) |

(52) U.S. Cl.
CPC ............ *G11B 19/048* (2013.01); *G11B 5/455* (2013.01); *G11B 5/6076* (2013.01); *G11B 2220/2516* (2013.01)

(58) Field of Classification Search
CPC ........... G11B 27/36; G11B 5/09; G11B 20/10; G11B 20/0013; G11B 5/00; G11B 11/10; G11B 11/105; G11B 2005/0021; G11B 5/02; G11B 5/54
USPC ....................... 360/55, 75, 31, 39, 46, 59, 67
See application file for complete search history.

(56) References Cited

U.S. PATENT DOCUMENTS

| 6,411,458 B1 * | 6/2002 | Billings ................. G11B 27/36 |
| | | 360/75 |
| 9,881,642 B2 | 1/2018 | Zhang et al. |

(Continued)

FOREIGN PATENT DOCUMENTS

JP        2007305286 A       11/2007

*Primary Examiner* — Nabil Z Hindi
(74) *Attorney, Agent, or Firm* — Kim & Stewart LLP

(57) ABSTRACT

According to one embodiment, when an inspection of a defect of a recording surface of the magnetic disk is carried out by using the first processing section and the second processing section on the basis of the output of the gap sensor, a magnetic disk device is configured to compare a threshold defined on the basis of outputs of the first processing section at a plurality of tracks excluding a track which is an inspection object and an output of the first processing section at the track which is the inspection object with each other and, when the output of the first processing section at the track which is the inspection object exceeds the threshold, detect that there is a defect on the track concerned of the magnetic disk.

9 Claims, 14 Drawing Sheets

(56) References Cited

U.S. PATENT DOCUMENTS

2007/0245814 A1 10/2007 Shitara et al.
2011/0299189 A1 12/2011 Li et al.

* cited by examiner

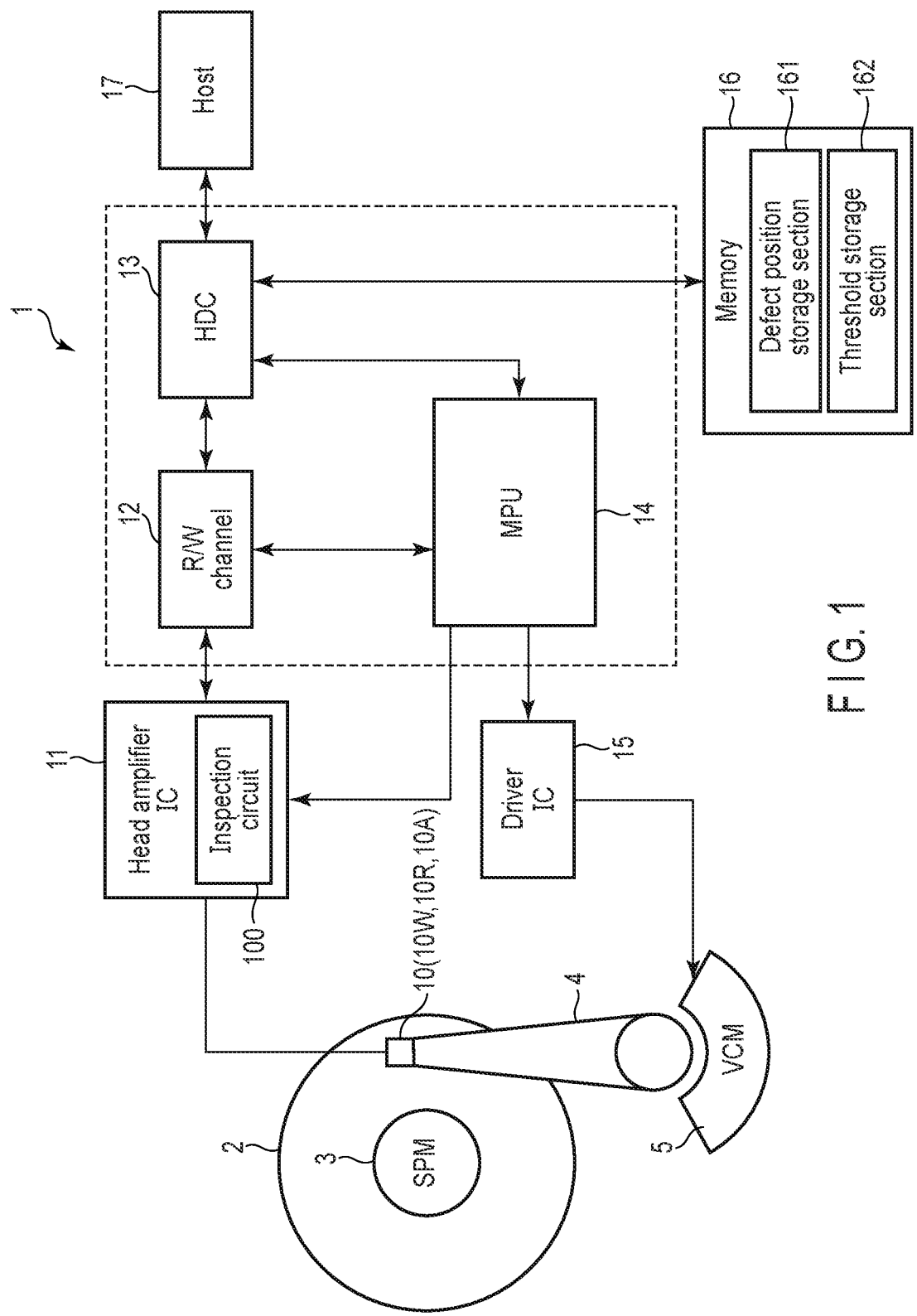
F I G. 1

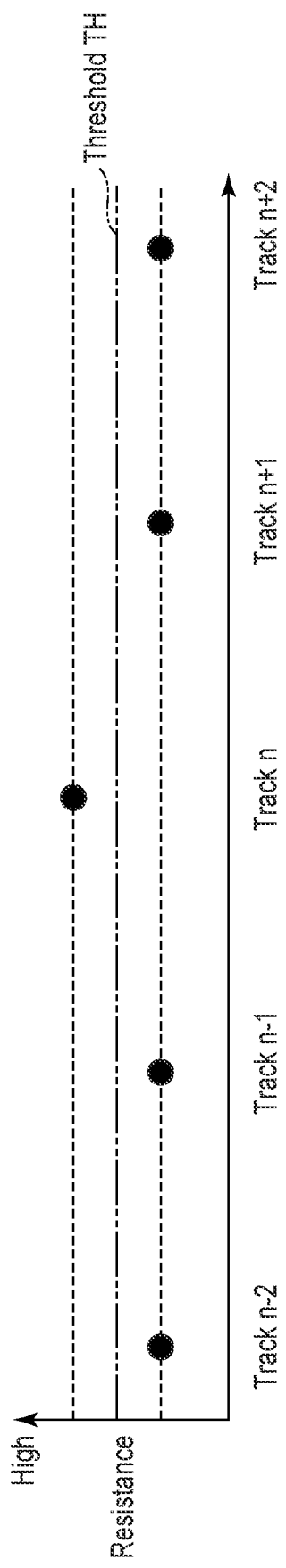
F I G. 14

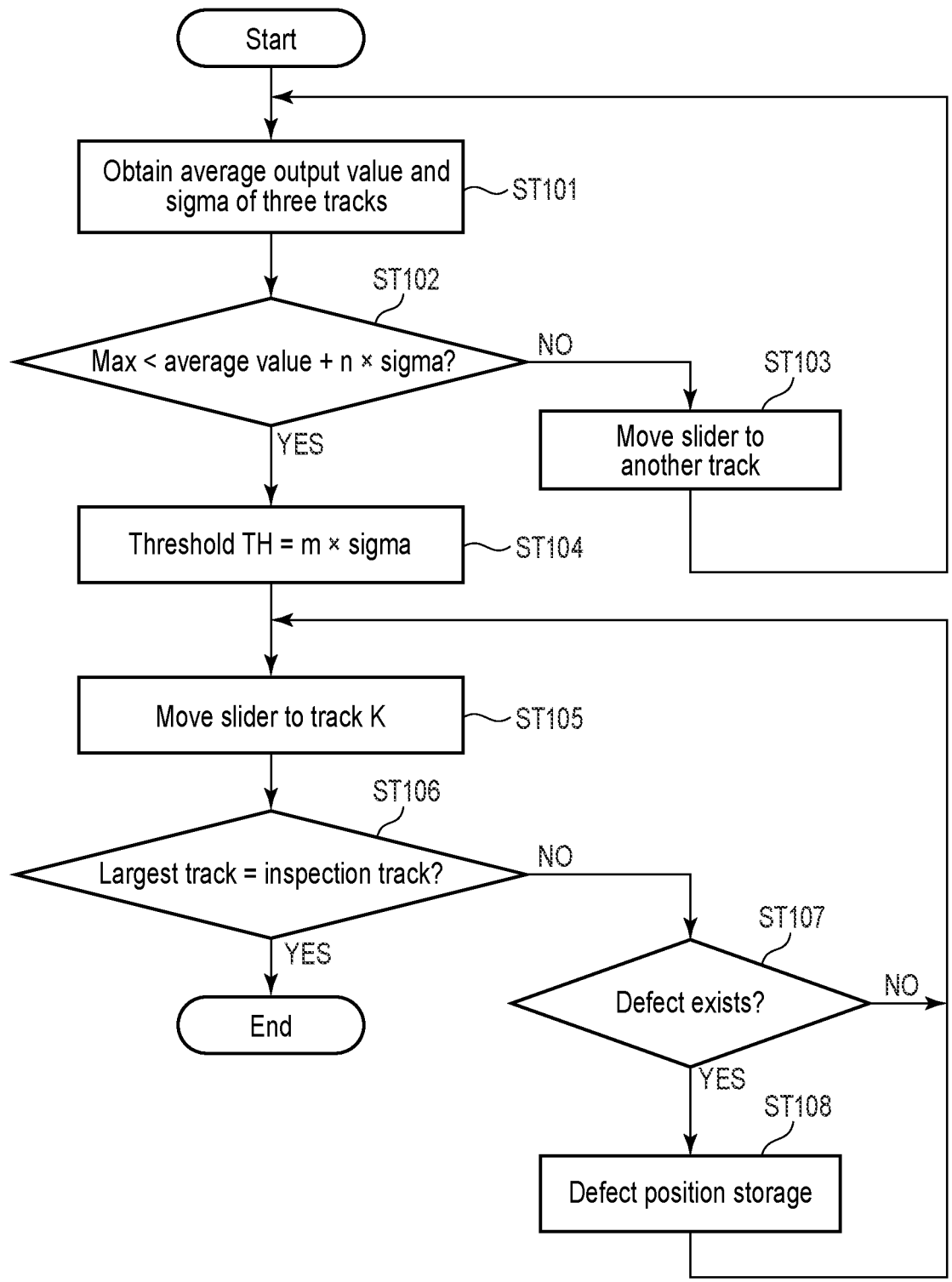
F I G. 15

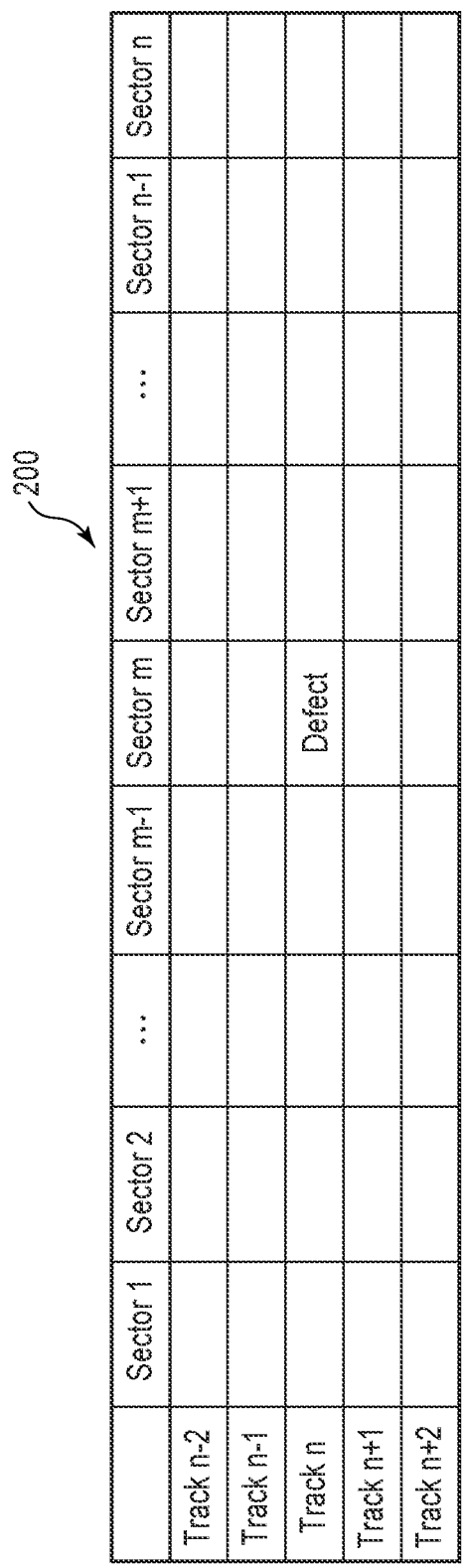
F I G. 18

MAGNETIC DISK INSPECTION METHOD OF MAGNETIC DISK DEVICE AND MAGNETIC DISK DEVICE

CROSS-REFERENCE TO RELATED APPLICATIONS

This application is based upon and claims the benefit of priority from Japanese Patent Application No. 2020-176105, filed Oct. 20, 2020, the entire contents of which are incorporated herein by reference.

FIELD

Embodiments described herein relate generally to a magnetic disk inspection method of a magnetic disk device and magnetic disk device.

BACKGROUND

In a magnetic disk device, a technique of detecting a flaw on a recording medium and registering the detected flaw is known.

On a magnetic disk of a magnetic disk device, a minute magnetic defect and geometrical defect such as a protrusion and pit or minute flaw exist. The part of the magnetic disk at which such a defect exists is poor in the quality of the recorded signal and, even if no abnormality is found at the time of the shipping inspection, by repetitively carrying out recording on adjacent tracks, the recording quality of the part concerned is deteriorated, and it becomes difficult to read the recorded information in some cases. Further, there is a possibility of the existence of a protrusion on the magnetic disk damaging the recording head, and this leads to spoiling of the reliability of the magnetic disk device. Accordingly, in order that the magnetic disk device may not write recording information to the part at which a magnetic defect or geometrical defect exists, it becomes necessary to detect the part at which a defect exists and register the part.

Embodiments described herein aim to provide a magnetic disk inspection method of a magnetic disk device and magnetic disk device capable of accurately detecting a defect on a magnetic disk.

BRIEF DESCRIPTION OF THE DRAWINGS

FIG. 1 is a block diagram showing an example of the configuration of a magnetic disk device according to a first embodiment.

FIG. 14 is a view showing an example of an output (amount of resistance) of a gap sensor S in units of tracks according to the first embodiment.

FIG. 15 is a flowchart showing an example of processing of determining a defect according to the first embodiment.

FIG. 18 is a view showing an example of information to be stored in a threshold storage section.

DETAILED DESCRIPTION

Figure 2:
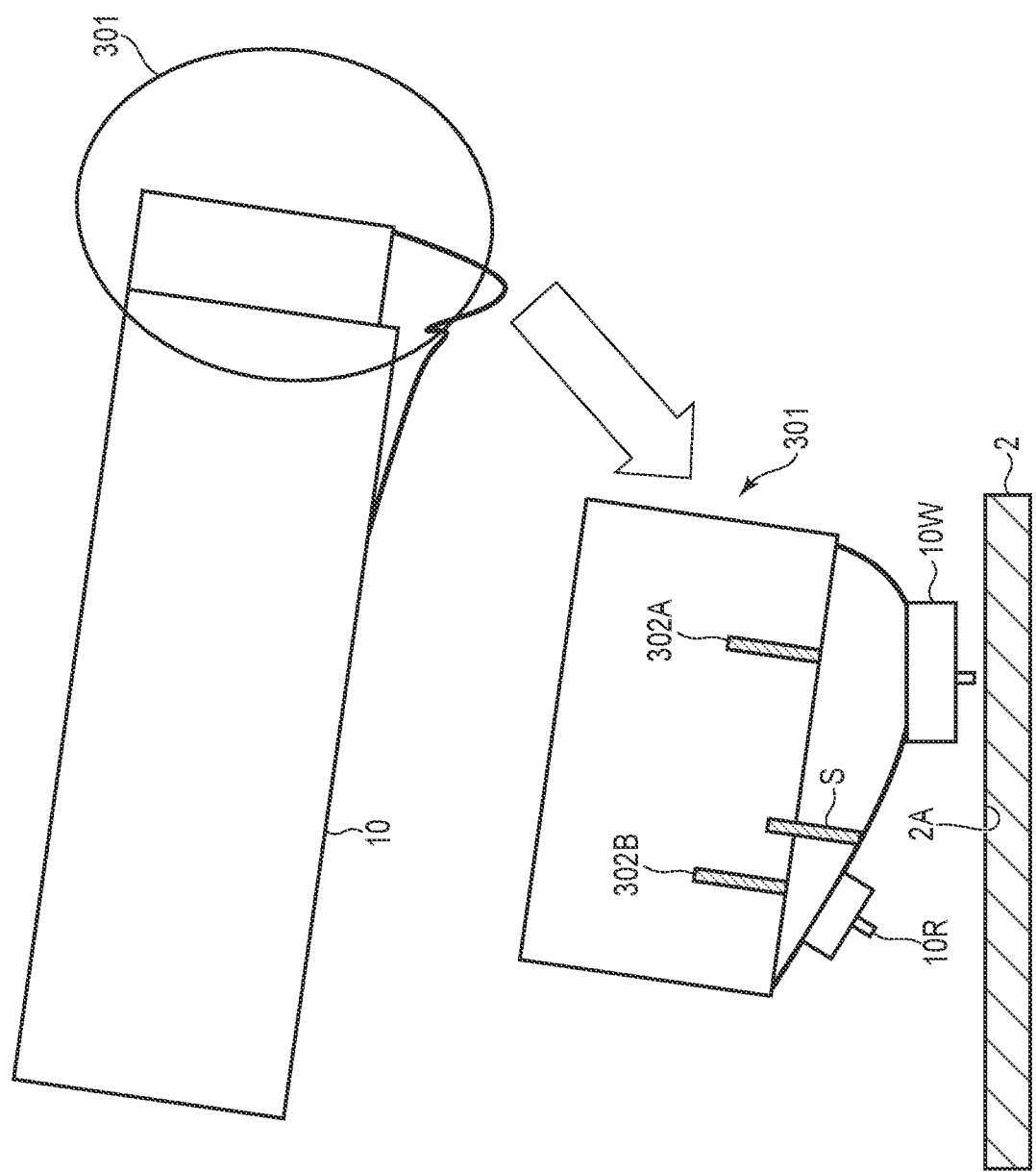
FIG. 2 is a schematic view for explaining an example of a configuration for pushing out a head surface of a slider toward the recording surface of the magnetic disk according to the first embodiment.

In general, according to one embodiment, a magnetic disk device includes a magnetic disk, a slider including a read head configured to read data from the magnetic disk, a write head configured to write data to the magnetic disk, a thermal actuator configured to adjust a gap between the read head or the write head and the magnetic disk, and a gap sensor configured to detect the gap, a preamplifier including a first processing section including a first filter configured to filter an output of the gap sensor at a predetermined frequency, and a second processing section including a second filter configured to filter the output of the gap sensor at a frequency higher than the frequency of the first filter, and a control section configured to control read/write of the slider from/to the magnetic disk. A magnetic inspection method of a magnetic disk device comprising when an inspection of a defect of a recording surface of the magnetic disk is carried out by using the first processing section and the second processing section on the basis of the output of the gap sensor, comparing a threshold defined on the basis of outputs of the first processing section at a plurality of tracks excluding a track which is an inspection object and an output of the first processing section at the track which is the inspection object with each other; and when the output of the first processing section at the track which is the inspection object exceeds the threshold, detecting that there is a defect on the track concerned of the magnetic disk.

Embodiments will be described hereinafter with reference to the accompanying drawings. Note that the disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

First Embodiment

FIG. 1 is a block diagram showing an example of the configuration of a magnetic disk device 1 according to a first embodiment.

As shown in FIG. 1, the magnetic disk device 1 is configured as, for example, a hard disk drive (HDD). The magnetic disk device 1 is provided with a magnetic disk 2, spindle motor (SPM) 3, actuator 4, voice coil motor (VCM) 5, magnetic head 10, head amplifier IC (preamplifier) 11, R/W channel 12, hard disk controller (HDC) 13, microprocessor (MPU) 14, driver IC 15, and memory 16.

Further, the magnetic disk device 1 is connectable to a host 17. Although details will be described later, the magnetic head 10 is provided with a write head 10W, read head 10R, and spin-torque-oscillator (STO) 100 which is a high-frequency oscillation element. It should be noted that the R/W channel 12, HDC 13, and MPU 14 may also be incorporated into a one-chip integrated circuit.

The magnetic disk 2 includes a substrate constituted of a non-magnetic material and formed into a circular disk-like shape. On each of recording surfaces of the substrate, a soft magnetic layer formed of a material exhibiting soft magnetic characteristics and functioning as a foundation layer, magnetic recording layer having magnetic anisotropy in the direction perpendicular to the recording surface and formed on the upper layer of the soft magnetic layer, and protective film layer formed on the upper layer of the magnetic recording layer are stacked on top of each other in layers in the order described. Here, the layers closer to the magnetic head 10 in the direction to the magnetic head 10 are defined as upper layers.

The magnetic disk 2 is fixed to the spindle motor (SPM) 3 and is rotated at a predetermined rotational speed by the SPM 3. It should be noted that the number of the magnetic disk 2 is not limited to one, and a plurality of magnetic disks 2 may also be attached to the SPM 3. The SPM 3 is driven by a drive current (or drive voltage) to be supplied thereto from the driver IC 15. A data pattern is recorded/reproduced on/from the magnetic disk 2 by the magnetic head 10.

The actuator 4 is provided in such a manner that the actuator 4 can freely be turned, and the magnetic head 10 is supported on the tip part of the actuator 4. The actuator 4 is turned by the voice coil motor (VCM) 5, whereby the magnetic head 10 is moved to a position on the desired track of the magnetic disk 2 and is positioned there. The VCM 5 is driven by a drive current (or drive voltage) to be supplied thereto from the driver IC 15.

The magnetic head 10 includes a slider 301, and write head 10W, read head 10R, and the like which are formed on the slider 301 (see FIG. 2). A plurality of magnetic heads 10 are provided according to the number of the magnetic disks 2. For example, as to the magnetic head 10, one magnetic head 10 is provided on each of the top surface and under-surface of one magnetic disk 2, i.e., two magnetic heads are provided on one magnetic disk 2.

The head amplifier IC 11 includes a circuit relating to drive and detection of oscillation characteristics of the STO 10A. Further, in this embodiment, the head amplifier IC 11 includes an inspection circuit (inspection section) 100. The inspection circuit 100 is a circuit configured to inspect a defect on the recording surface of the magnetic disk 2. Details of the inspection circuit 100 will be described later with reference to FIG. 12.

The head amplifier IC 11 is provided between the magnetic head 10 and R/W channel (read/write circuit). The head amplifier IC 11 executes drive, and drive signal detection, and the like of the STO 10A. Furthermore, the head amplifier IC 11 supplies a write signal (write current) corresponding to write data to be supplied thereto from the R/W channel 12 to the write head 10W. Further, the head amplifier IC 11 amplifies a read signal output from the read head 10R and transmits the amplified read signal to the R/W channel 12. Furthermore, although illustrations are omitted, the head amplifier IC 11 includes an STO control section, recording coil control section, reproduced signal detecting section, and heater control section. The STO control section controls a current to be made to flow through the STO 10A. The recording coil control section controls a recording current to be supplied to the coil of the write head 10W according to a write signal. The reproduced signal detecting section detects a signal (read data) reproduced by the read head 10R. The heater control section controls supply of power to the heater (thermal actuator).

The R/W channel 12 is a signal processing circuit configured to process signals relating to read/write. The R/W channel 12 includes a read channel configured to execute signal processing of read data and write channel configured to execute signal processing of write data. The R/W channel 12 converts a read signal into digital data, and decodes read data from the digital data. The R/W channel 12 encodes write data to be transmitted thereto from the HDC 13, and transfers the encoded write data to the head amplifier IC 11.

The HDC 13 controls write of data to the magnetic disk 2 through the head amplifier IC 11, R/W channel 12, and MPU 14, and read of data from the magnetic disk 2. The HDC 13 constitutes an interface between the magnetic disk device 1 and host 17, and executes transfer control of read data and write data. That is, the HDC 13 functions as a host interface controller configured to receive a signal transmitted from the host 17, and transfer a signal to the host 17. When transferring a signal to the host 17, the HDC 13 executes error correction processing of data of a reproduced signal read by the magnetic head 10 and decoded in accordance with the control of the MPU 14. Further, the HDC 13 receives a command (write command, read command, and the like) transferred thereto from the host 17, and transmits the received command to the MPU 14.

The MPU 14 is the main controller of the magnetic disk device 1, and executes control of a read/write operation and servo control necessary for positioning of the magnetic head 10. It should be noted that on the magnetic disk 2, positioning information is recorded, and servo control of positioning the magnetic head 10 to a desired position (track) is executed on the basis of the positioning information read by the read head 10R.

The driver IC 15 controls drive of the SPM 3 and VCM 5 in accordance with the control of the MPU 14. By driving the VCM 5, the magnetic head 10 is positioned to a target track on the magnetic disk 2.

The memory 16 includes a volatile memory and nonvolatile memory. For example, the memory 16 includes a buffer memory constituted of a DRAM and flash memory. The memory 16 stores therein programs necessary for the processing of the MPU 14, and parameters such as control values and the like concerning various types of control. Further, in this embodiment, in the memory 16, a defect position storage section 161 and threshold storage section 162 are provided. The defect position storage section 161 stores therein a position (for example, track number and sector number) at which a defect is found on the magnetic disk 2. Here, the term 'defect' implies a protrusion, pit or minute flaw on the magnetic disk 2. Such a defect is detected by, for example, an inspection at the time of shipment and is stored in the defect position storage section 161 of the memory. Details of the inspection concerned will be described later. The threshold storage section 162 stores therein a threshold to be used when a defect is detected. Details of the threshold will be described later.

Next, the configuration in which heaters 302A and 302B are provided in the vicinities of the write head 10W and read head 10R to be mounted on the slider 301 in the magnetic disk device 1, and head surfaces of the write head 10W and read head 10R are pushed out by the heaters 302A and 302B toward the magnetic disk 2 will be described below.

FIG. 2 is a schematic view for explaining an example of a configuration for pushing out a head surface of a slider 301 toward the recording surface of the magnetic disk 2.

As shown in FIG. 2, the slider 301 is shown and an enlarged view of a tip part of the slider 301 is shown ahead of the arrow. At the tip part concerned, the slider 301 including the write head 10W and read head 10R is provided in such a manner that head surface of the slider 301 is opposed to the recording surface 2A of the magnetic disk 2. Furthermore, in the vicinities of the write head 10W and read head 10R, the heater 302A and 302B are respectively provided. A voltage is applied to each of the heaters 302A and 302B by the heater control section in the already-described head amplifier IC 11, whereby the heaters 302A and 302B are expanded, head surfaces of the write head 10W and read head 10R are pushed out toward the recording surface 2A of the magnetic disk 2, and gaps between the head surfaces of the write head 10W and read head 10R and recording surface of the magnetic disk 2 are adjusted.

The gaps between the head surfaces of the write head 10W and read head 10R and recording surface of the magnetic disk 2 are detected by the gap sensor S. In this embodiment, the gap sensor S is a resistance-type sensor.

In the magnetic disk device 1 described above, a defect on the magnetic disk 2 is, as already described above, registered in the defect position storage section 161 of the memory 16 at the time of the shipping inspection by, for example, the following method. A first method is a method of reading a signal recorded on the magnetic disk 2 by means of the read head 10R to thereby reproduce the read signal, and detecting a defect by utilizing a change in the amplitude of the reproduced signal. A second method is a method of detecting a defect by utilizing a change in the amplitude of a signal output from the gap sensor S mounted on the slider 301.

As to these methods, for example, when a local defect exists in one sector of one track on the magnetic disk 2 or when a defect is a defect existing astride a plurality of tracks and astride a sufficiently small number of sectors of one track, it becomes possible to detect the defect by monitoring the variation in the amplitude of a reproduced signal or output of the gap sensor S within one track.

It is possible to detect a geometrical defect of the magnetic disk 2, i.e., a protrusion or depression such as a flaw by the already-described second method by utilizing the output of the aforementioned gap sensor S. Hereinafter, the operation will be described for each the case of the protrusion and case of the depression separately from each other.

Figure 3:
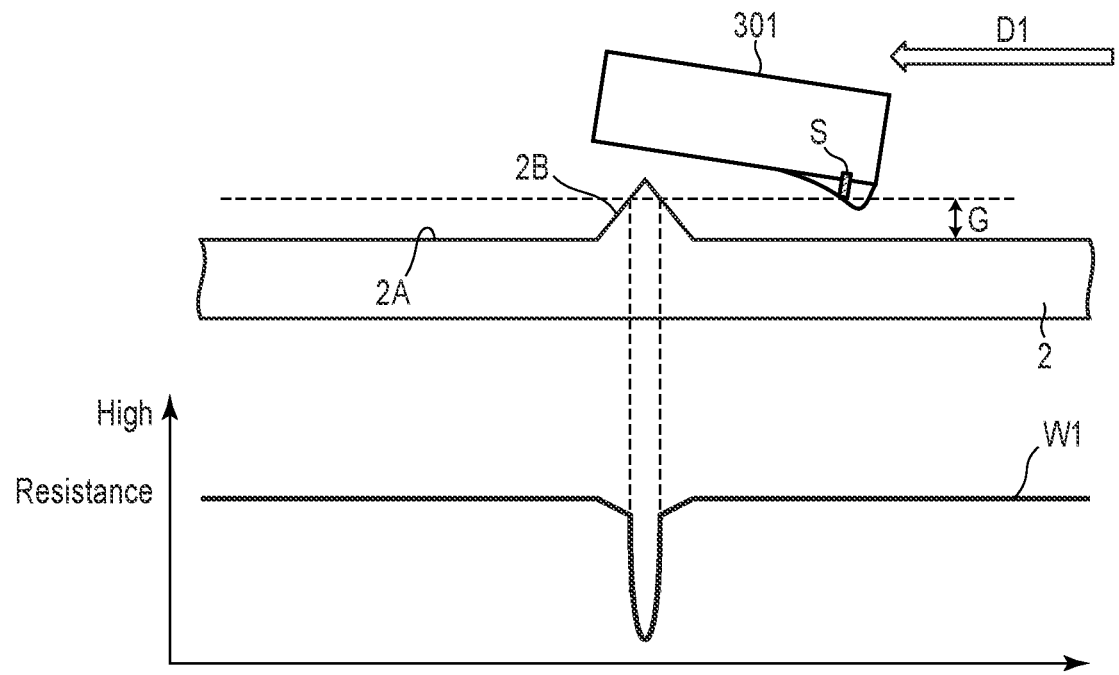
FIG. 3 is a view showing an example of a case where there is a protruding part on the magnetic disk according to the first embodiment.

FIG. 3 is a view showing an example of a case where there is a protruding part 2B on the magnetic disk 2.

More specifically, as shown in FIG. 3, a state where the slider 301 moves in the relative direction of movement (actually an apparent direction of travel because the magnetic disk 2 rotates, and hereinafter referred to as a relative direction) D1 is shown, and the protruding part 2B exists on the recording surface 2A of the magnetic disk 2.

Here, in this embodiment, the gap sensor S is, as already described previously, a resistance-type sensor, and by making a current flow through the gap sensor S, the gap sensor S generates heat. The temperature of the gap sensor S at this time is determined by the electric power put into the gap sensor S, gap between the gap sensor S and magnetic disk 2, and relative speed between the magnetic disk 2 and slider 301. When the gap sensor S comes close to the protruding part 2B on the magnetic disk 2 in a state where the current or voltage to be put into the gap sensor S is kept constant, the gap between the gap sensor S and magnetic disk 2 becomes smaller, and it is made easier for the heat of the gap sensor S to transfer to the magnetic disk 2. Accordingly, the temperature of the gap sensor S is lowered. Furthermore, when the gap sensor S comes into contact with the protruding part 2B, the gap sensor S and the magnetic disk 2 come into solid contact with each other, and hence the conductivity of heat to be conducted from the gap sensor S to the magnetic disk 2 conspicuously increases in comparison with the case where the gap exists between them. Accordingly, the heat leaks out to the magnetic disk 2, and the temperature of the gap sensor S abruptly lowers. Then, when the gap sensor S passes through the protruding part 2B, the gap between the gap sensor S and magnetic disk 2 is restored to the original state again, and hence the temperature of the gap sensor S is also restored to the original state. In this embodiment, the gap sensor S employs a metal as the material, and hence the resistance thereof changes relatively to the temperature. When the temperature rises, the resistance of the gap sensor S becomes higher, and hence, it becomes possible to detect presence/absence of the protruding part 2B by monitoring the resistance value of the gap sensor S.

On the lower side of FIG. 3, a waveform W1 obtained by detecting the amount of the resistance on the basis of the output of the gap sensor S is shown. In FIG. 3, the axis of ordinate indicates the amount of the resistance, and indicates that the resistance becomes upwardly higher along the axis of ordinate.

It is shown that although the amount of the resistance indicated by the waveform W1 is kept at a given value in the normal state, the amount of the resistance falls at around the time when the gap sensor S comes into contact with the protruding part 2B, and abruptly reduces at the time of the contact, then at around the time when the gap sensor S passes through the protruding part 2B, abruptly returns toward the normal state, then, at around the time when the gap sensor S is about to pass through the protruding part 2B, the rate of return becomes gradual and, when the gap sensor S completely passes through the protruding part 2B, the amount of the resistance is restored to the original amount. Accordingly, when the waveform W1 is monitored and, if the amount of the resistance abruptly lowers, it is possible to detect that a protruding part 2B is present on the recording surface 2A of the magnetic disk 2.

Figure 4:
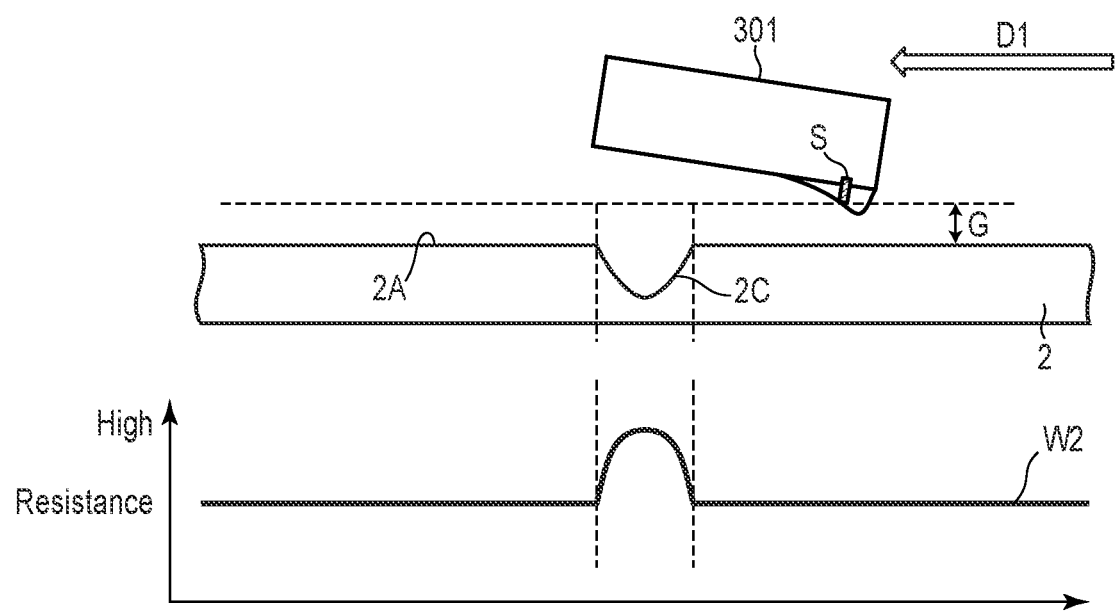
FIG. 4 is a view showing an example of a case where there is a depressed part on the magnetic disk according to the first embodiment.

FIG. 4 is a view showing an example of a case where there is a depressed part 2C on the magnetic disk 2.

More specifically, as shown in FIG. 4, the state of FIG. 4 is a state where the slider 301 moves in the relative direction D1 on the recording surface 2A of the magnetic disk 2, and the depressed part 2C exists on the recording surface 2A.

When the gap sensor S passes through a position above the depressed part 2C, the gap between the gap sensor S and magnetic disk 2 is increased, whereby it is made harder for the heat of the gap sensor S to transfer to the magnetic disk 2. Accordingly, the temperature of the gap sensor S rises, and by detecting an increase in the amount of the resistance of the gap sensor S, it becomes possible to detect the presence of the depressed part 2C.

On the lower side of FIG. 4, a waveform W2 obtained by detecting the amount of the resistance on the basis of the output of the gap sensor S is shown. In FIG. 4, the axis of ordinate indicates the amount of the resistance, and indicates that the resistance becomes upwardly higher along the axis of ordinate, this being identical to the case of FIG. 3.

It is shown that although the amount of the resistance indicated by the waveform W1 is kept at a given value in the normal state, the amount of the resistance gradually increases at around the time when the gap sensor S reaches the depressed part 2C, increases to the maximum at around the point in time when the depressed part 2C is deepest, then, at around the time when the gap sensor S passes through the deepest point, gradually lowers and, when the gap sensor S completely passes through the depressed part 2C, the amount of the resistance is restored to the original amount. Accordingly, when the waveform W2 is monitored and, if the amount of the resistance increases, it is possible to detect that a depressed part 2C is present on the recording surface of the magnetic disk 2.

Here, the actual protruding part 2B possessed by the magnetic disk 2 is minute, and hence the change in the resistance occurs in an instant. Accordingly, in this embodiment, a high-pass filter (HPF) is used for the purpose of enhancing the detection sensitivity. On the other hand, regarding the depressed part 2C of the magnetic disk 2, there is a case where the depressed part 2C is such a defect that the magnetic film of the magnetic disk 2 is partially lost, and case where the depressed part 2C is a long depressed part such as a scratch. For example, in the case of the magnetic film loss, the depressed part 2C is minute, and hence it is effective to use the HPF as in the case of the aforementioned protruding part 2B.

However, as to the defect of the magnetic disk 2, there is not only the case where the defect is the protruding part 2B or depressed part 2C described above, but also the case where the depressed parts are strung long together to form a groove or case where the groove is accompanied by a burr.

Figure 5:
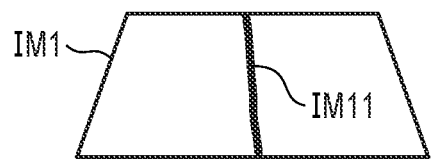
FIG. 5 is a view showing an AFM image showing an example of a case where a groove is formed by a string of depressed parts according to the first embodiment.
Figure 6:
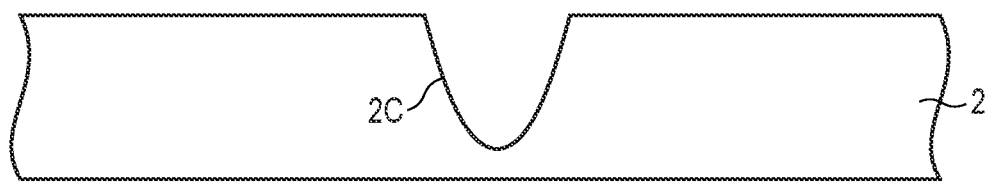
FIG. 6 is a view showing a cross section of a groove of FIG. 5.
Figure 7:
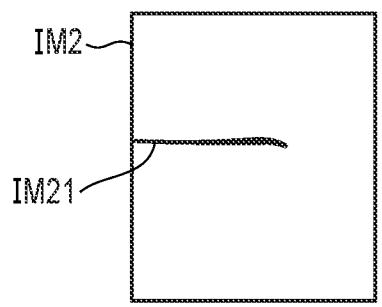
FIG. 7 is a view showing an AFM image showing an example of a case where a groove is formed by a string of depressed parts and the groove is further accompanied by a burr.
Figure 8:
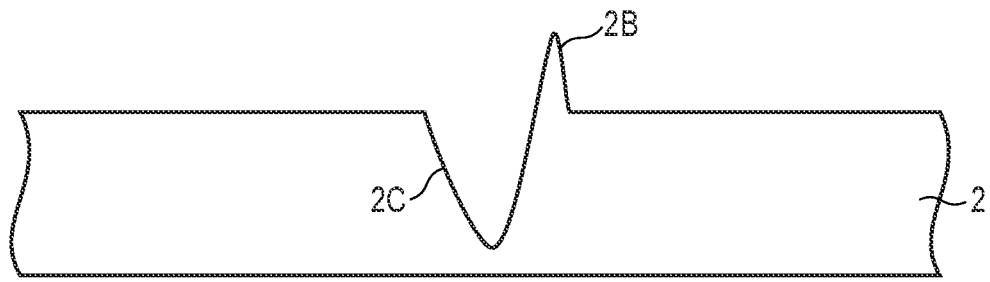
FIG. 8 is a view showing a cross section of a groove accompanied by a burr.

Here, FIG. 5 is an AFM image IM1 showing an example of a case where a groove is formed of a string of depressed parts, and FIG. 7 is an AFM image IM2 showing an example of a case where a groove is formed of a string of depressed parts and the groove is further accompanied by a burr. FIG. 6 is a view showing a cross section of the groove of FIG. 5, and FIG. 8 is a view showing a cross section of the groove accompanied by a burr of FIG. 7. Here, the term 'AFM image' implies an image taken by means of an atomic force microscope. The AFM is a device configured to manipulate the specimen surface by means of a needle provided at a tip of a cantilever, and capable of measuring the unevenness of the surface shape at the subnanometer level.

As shown in FIG. 5, in the AFM image IM1, an image IM11 of the groove a cross section of which is shown in FIG. 6 and which is constituted of a string of depressed parts is included. Further, as shown in FIG. 7, in the AFM image IM2, an image IM21 of the groove a cross section of which is shown in FIG. 8 and which is constituted of a string of depressed parts and is further accompanied by a burr is included.

In the case of the defect of the groove (or groove accompanied by a burr and shown by the image IM21 of FIG. 7) shown by the image IM11 of FIG. 5, when the groove is perpendicular to the relative direction D1 of the slider 301, the defect is detected exactly in the same manner as in the case of the depressed part 2C. Accordingly, the defect can be detected by filtering the amplitude of the output of the gap sensor S by means of an HPF. However, the longitudinal direction of the defect such as a groove is not always perpendicular to the relative direction D1 of the slider 301. There is even a case where the angle between the direction of the defect such as a groove and relative direction D1 of the slider 301 is less than 90° and, at the worst, where both the directions are parallel to each other, i.e., where the defect exists in the circumferential direction on the magnetic disk 2.

Figure 9A:
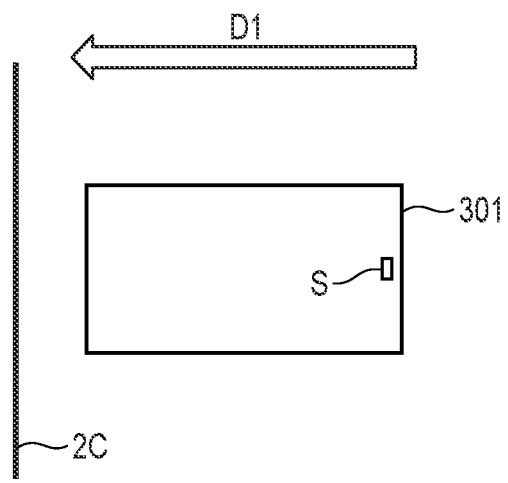
FIG. 9A is a view showing an example of a change in the output of a gap sensor according to the first embodiment.
Figure 9B:
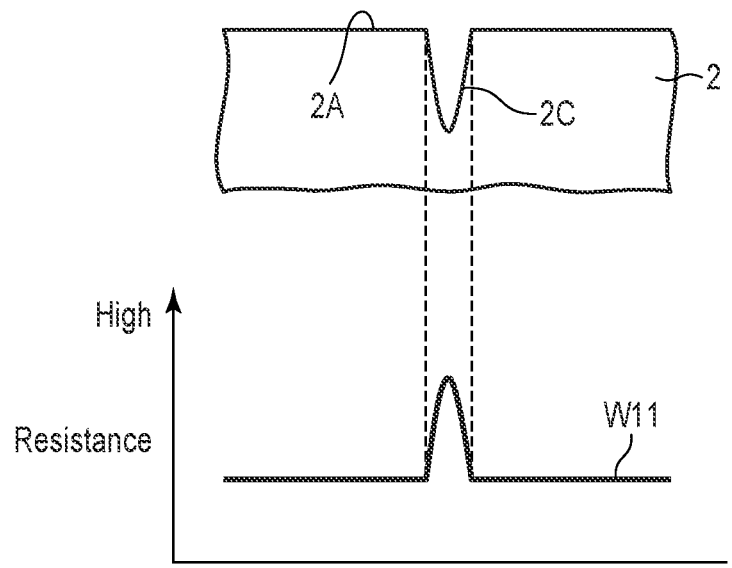
FIG. 9B is a view showing an example of a change in the output of a gap sensor according to the first embodiment.
Figure 10A:
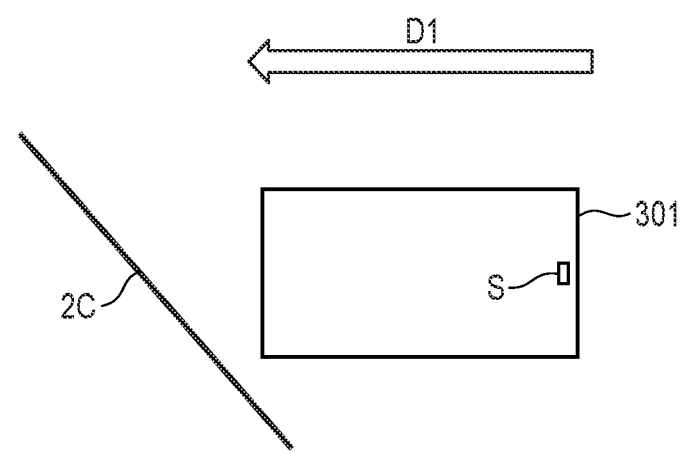
FIG. 10A is a view showing an example of a change in the output of a gap sensor according to the first embodiment.
Figure 10B:
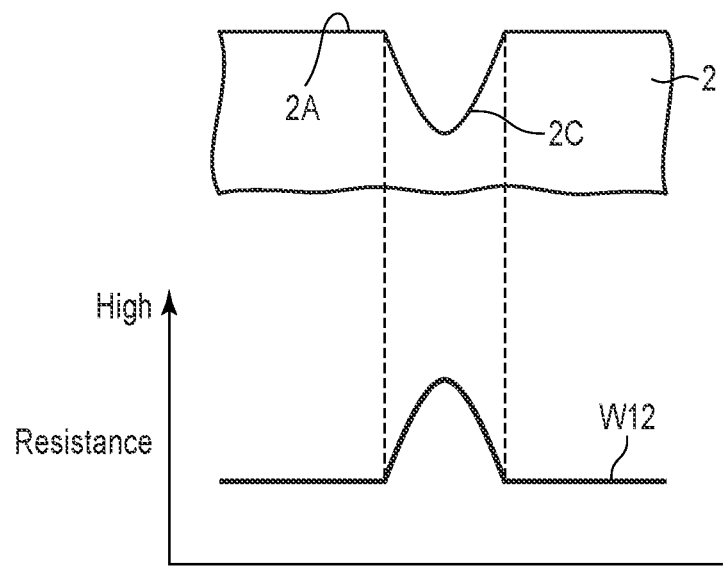
FIG. 10B is a view showing an example of a change in the output of a gap sensor according to the first embodiment.
Figure 11A:
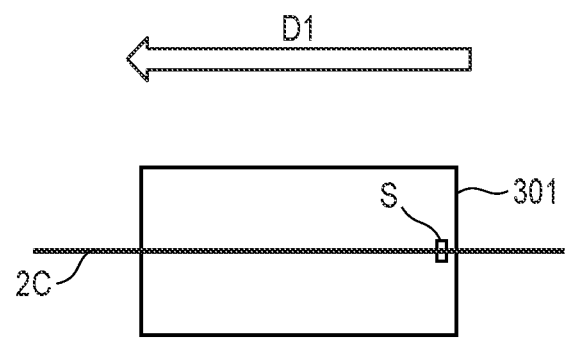
FIG. 11A is a view showing an example of a change in the output of a gap sensor according to the first embodiment.
Figure 11B:
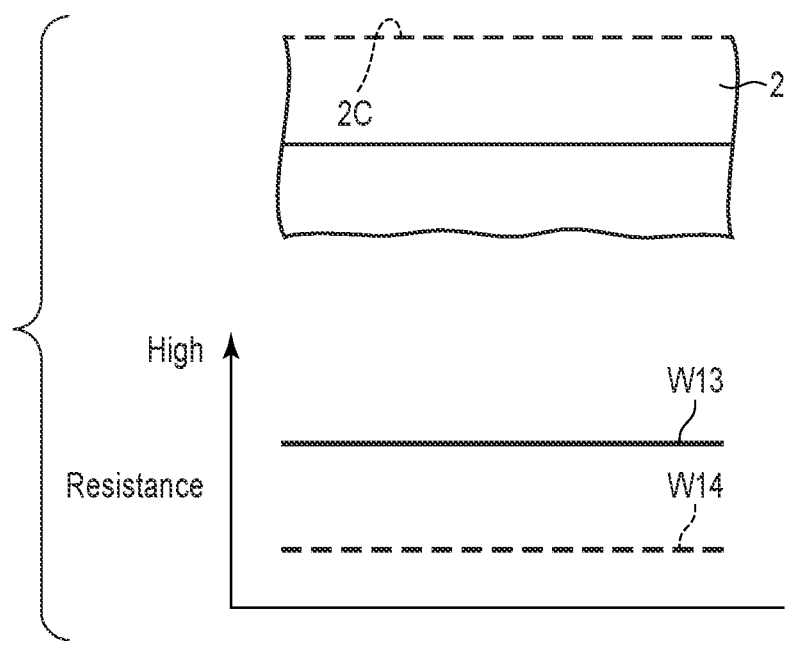
FIG. 11B is a view showing an example of a change in the output of a gap sensor according to the first embodiment.

Each of FIGS. 9A to 11B shows an example of a change in the output of the gap sensor S in each of the case where the angle formed between the direction of the defect such as a groove constituted of depressed parts 2C and relative movement direction of the slider 301 is rectangular (see FIGS. 9A and 9B), case where the angle is 45° (see FIGS. 10A and 10B), and case where both the directions are parallel to each other (see FIGS. 11A and 11B).

FIG. 9A shows the case where the angle between the direction of the defect such as a groove constituted of depressed parts 2C and relative movement direction D1 of the slider 301 is a rectangular angle. Further, FIG. 9B shows a change in the amount of the resistance (waveform W11) to be output from the gap sensor S, the change being correspondent to the groove constituted of depressed parts 2C of the recording surface 2A of the magnetic disk 2. As shown in FIG. 9B, the waveform W11 changes in such a manner as to become larger at a part thereof corresponding to the groove constituted of the depressed parts 2C.

FIG. 10A shows the case where the angle between the direction of the defect such as a groove constituted of depressed parts 2C and relative movement direction D1 of the slider 301 is 45°. Further, FIG. 10B shows a change in the amount of the resistance (waveform W12) to be output from the gap sensor S, the change being correspondent to the groove of the recording surface 2A of the magnetic disk 2. As shown in FIG. 10B, although the waveform W12 changes in such a manner as to become larger at the part thereof corresponding to the groove constituted of depressed parts 2C, the time required of the slider 301 to pass through the groove becomes longer as compared with the case of FIG. 9B, and hence the change is gentler.

FIG. 11A shows a case where the direction of the defect such as a groove constituted of depressed parts 2C and relative movement direction D1 of the slider 301 are parallel to each other. Further, FIG. 11B shows a change in the amount of the resistance (waveform W13) to be output from the gap sensor S, the change being correspondent to the groove of the recording surface 2A of the magnetic disk 2. As shown in FIG. 11B, the waveform W13 is greater than the output waveform W14 of the gap sensor of the case where there is no groove constituted of depressed parts 2C by an amount corresponding the influence of the groove, and the resistance is output at a fixed amount.

As shown in FIGS. 9A to 10B, when the angle between the direction of the defect such as a groove constituted of depressed parts 2C and relative direction D1 of the slider 301 is large, it is possible to detect the defect from the output of the gap sensor S. On the other hand, when the direction of the defect such as a groove and relative movement direction D1 of the slider 301 are parallel to each other, the time during which the output of the gap sensor S is constant becomes longer, a change in the waveform is not found as in the case of the output waveform W13 and, no matter how thoroughly and accurately the frequency of the HPF is adjusted, it is not possible to detect the defect.

In the magnetic disk device 1 of this embodiment, it becomes possible to detect the defect even in the case where the direction of the defect such as a groove constituted of depressed parts 2C and relative movement direction D1 of the slider 301 are parallel to each other, by carrying out an inspection using an inspection circuit 100 details of which will be described later.

Figure 12:
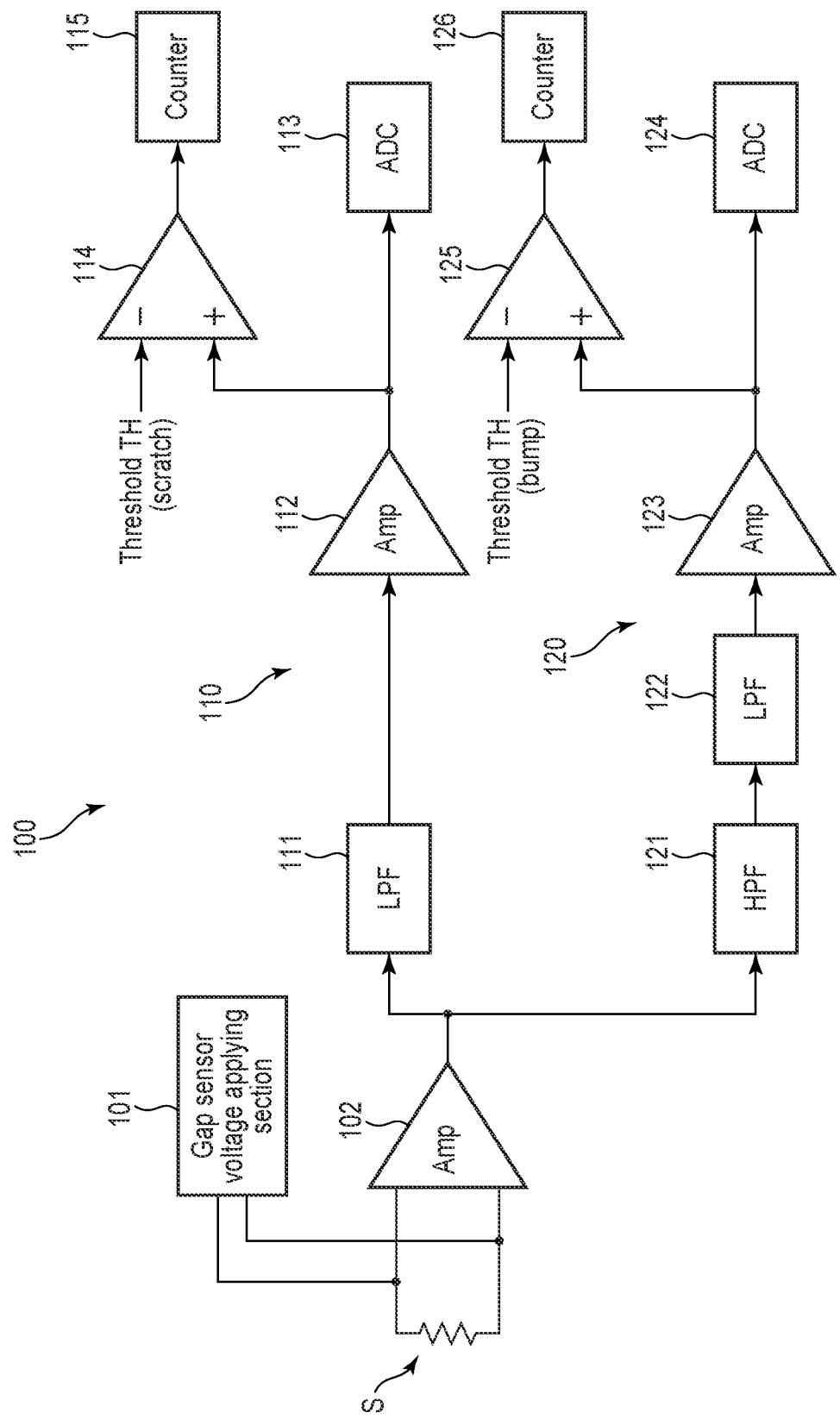
FIG. 12 is a view showing an example of a circuit configuration of an inspection section according to the first embodiment.

FIG. 12 is a view showing an example of the circuit configuration of an inspection circuit 100.

As shown in FIG. 12, the inspection circuit 100 is configured in such a manner that when a voltage is applied to the gap sensor S by a gap sensor voltage applying section 101, a resistance value of the gap sensor S is output to an amplifier 102, and the output is amplified by the amplifier 102, and includes processing sections of two systems each configured to process the output amplified by the amplifier 102. The processing section (first processing section) 110 of the first system includes a low-pass filter (first filter) (LPF) 111, amplifier 112, analog-digital converter (ADC) 113, comparator 114, and counter 115. The processing section (second processing section) 120 of the second system includes an HPF (second filter) 121, LPF 122, amplifier 123, ADC 124, comparator 125, and counter 126.

More specifically, the processing section 110 of the first system subjects the output of the amplifier 102 to filtering processing by the LPF 111, and amplifies the output of the LPF 111 after being subjected to filtering processing by the amplifier 112. The output amplified by the amplifier 112 is output from the amplifier 112 to both the ADC 113 and comparator 114. In the ADC 113, the analog signal is converted into a digital signal. This digital signal is transmitted to the MPU 14 and is used for gap adjustment processing and the like. On the other hand, the comparator 114 compares the output of the amplifier 112 and threshold TH (threshold of a scratch (groove constituted of depressed parts 2C)) with each other. When the output of the amplifier 112 is greater than the threshold TH, this fact is counted by the counter 115. As described above, the processing of the processing section 110 of the first system is processing in which the signal output from the gap sensor S can be obtained through the LPF 111, and the number of times the threshold TH is exceeded can be counted. This count processing is carried out, in this embodiment, in units of tracks.

Further, more specifically, the processing section 120 of the second system subjects the output of the amplifier 102 to filtering processing by the HPF 121, thereafter further subjects the output of the HPF 121 to filtering processing by the LPF 122, and amplifies the output after being subjected to the filtering processing by the amplifier 123. The output amplified by the amplifier 123 is output from the amplifier 123 to both the ADC 124 and comparator 125. In the ADC 124, the analog signal is converted into a digital signal. This digital signal is transmitted to the MPU 14, and is used for the gap adjustment processing and the like, this being identical to the case of the processing section of the first system. On the other hand, in the comparator 125, the output of the amplifier 123 and threshold TH (threshold of the bump (protruding part 2B, depressed part 2C)) are compared with each other. When the output of the amplifier 123 is greater than the threshold TH, this fact is counted by the counter 126. As described above, the processing of the processing section 120 of the second system is processing in which the signal output from the gap sensor S can be obtained through the HPF 121 and LPF 122, and the number of times the threshold TH is exceeded can be counted. This count processing is carried out, in this embodiment, in units of tracks, this being identical to the case of the processing section 110 of the first system.

Owing to the count value of the counter 126 based on the signal passing through the processing section 120 (HPF) of the second system, it becomes possible to detect an abrupt change in the defect of the magnetic disk 2 such as the protruding part 2B and depressed part 2C, and by monitoring the count value (output level) of the counter 115 based on the signal (hereinafter also referred to as the LPF output) passing through the processing section 110 (LPF) of the first system, it becomes possible to detect the groove or the like constituted of depressed parts 2C.

It should be noted that, although in this embodiment, the ADCs 113 and 124 are described as to the case where the ADCs 113 and 124 are provided in the head amplifier IC 11, the ADCs 113 and 124 may also be configured to be provided in the R/W channel 12. When the ADCs 113 and 124 are configured in this way, it becomes possible for the MPU 14 to subject the waveform itself to processing treatment, and it becomes possible to simplify the configuration of the inspection circuit 100.

Figure 13:
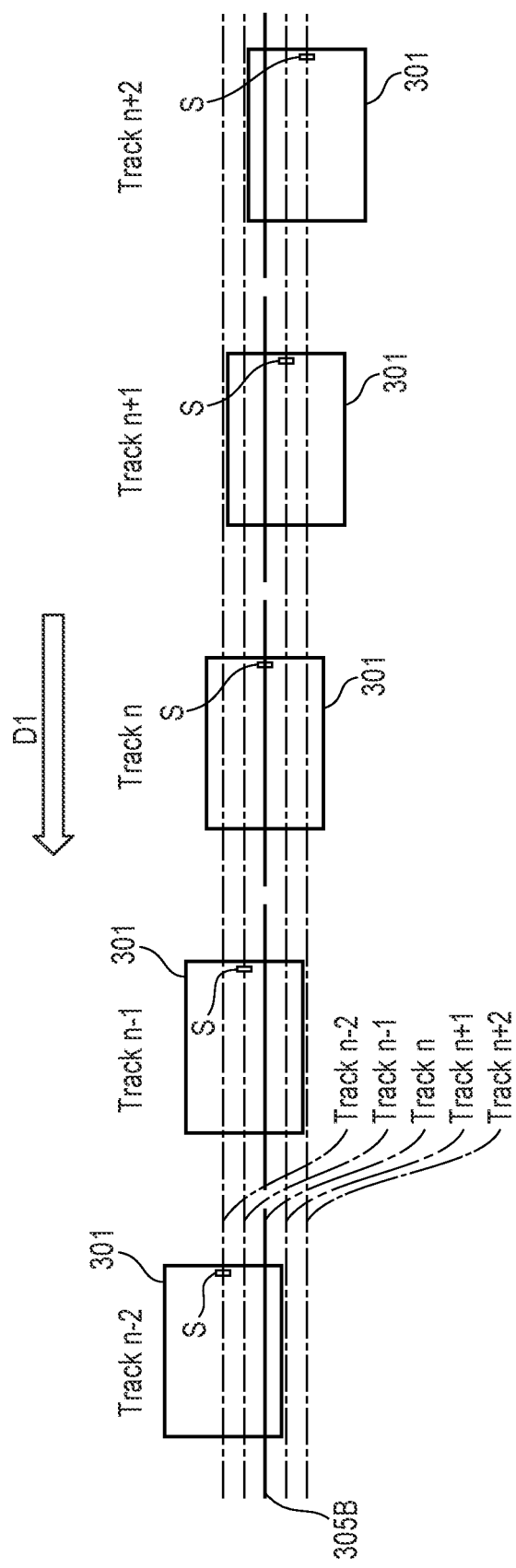
FIG. 13 is a view for explaining an example of a method of inspecting defects in units of tracks according to the first embodiment.

Next, the inspection method of a defect of the magnetic disk 2 will be described below with reference to FIGS. 13 to 15. FIG. 13 is a view for explaining an example of a method of inspecting defects in units of tracks, FIG. 14 is a view showing an example of an output (amount of resistance) of a gap sensor S in units of tracks, and FIG. 15 is a flowchart showing an example of processing of determining a defect.

The inspection of this embodiment is executed by the inspection circuit 100 of the head amplifier IC 11. Further, when the defect forms a predetermined angle with the relative direction D1 of the slider 301, as already described, it is possible to inspect a defect of the magnetic disk 2 on the basis of the signal passing through the processing section 120 of the second system. Accordingly, hereinafter, descriptions will be given of the configuration in which when the direction of the defect (groove constituted of depressed parts 2C) is parallel to the relative movement direction of the slider 301, the defect concerned is detected.

When inspecting the defect of the magnetic disk 2, the MPU 14 moves the slider 301 in units of tracks in sequence, and detects whether or not a defect exists on each track. More specifically, as shown in FIG. 13, the MPU 14 uses the slider 301 to carry out an inspection in sequence from the track n−2, in the order of n−1, n, n+1, and n+2. At this time, by calculating an average of one-round-track outputs (LPF outputs) of signals passing through the processing section 110 of the first system, it is possible for the MPU 14 to obtain the output of the gap sensor S at each of the tracks n−2, n−1, n, n+1, and n+2 as shown in FIG. 14. A track on which a defect exists exhibits a resistance value higher than the other tracks. In the example shown in FIG. 14, only the track n exhibits a high resistance value, and hence the MPU 14 can detect that a defect exists on the track n. Regarding specifically whether or not the resistance value is high or low, in this embodiment, by determining the threshold TH (of scratch) in advance from the average and dispersion of output values of the processing section 110 of the first system at a plurality of tracks previously presumed to have no defect, it becomes possible to determine that a defect (groove constituted of depressed parts in the circumferential direction) exists on a track exceeding this threshold TH.

For example, the threshold TH concerned may be determined by using output values of the LPF outputs at tracks adjacent to the track which is the inspection object. Further, for example, the threshold TH may be set by taking the average of the output values of the LPF outputs and a variation thereof at a plurality of tracks (for example three tracks) immediately precedent to (just on the upstream side of) the track which is the inspection object into consideration. Furthermore, for example, an interval corresponding to at least one track or more may be provided between the aggregate of the plurality of tracks for determining the threshold TH and track which is the inspection object. By providing the interval, it becomes possible to minimize the influence of the output value of the LPF even in a case where the LPF output gradually changes. Further, when a track on which a defect exists is detected, the MPU 14 may define the threshold TH by excluding the LPF output of the track concerned. For example, when defining the threshold TH by averaging the output values of the LPF outputs at three tracks immediately precedent to the track which is the inspection object, if it is detected that a defect exists on one of the three tracks, the MPU 14 may define the threshold TH by adding an output value of an LPF output at a track further on the upstream side to the output values of the LPF outputs at the two tracks without adopting the LPF output at the defective track.

Next, details of the processing of determining the defect will be described below. In this embodiment, the case where the threshold TH is defined on the basis of the LPF outputs at tracks immediately precedent to the track which is the inspection object, and existence of a defect is determined for each track by using the defined threshold TH will be described.

As shown in FIG. 15, the MPU 14 obtains an average value (average output value) of the LPF outputs of the three tracks, and standard deviation (sigma) of the LPF outputs of the three tracks (ST101).

Next, the MPU 14 determines whether or not the maximum value is the average value+n (n: natural number)× sigma (ST102). More specifically, the MPU 14 determines whether or not the maximum value of the LPF outputs of the three tracks is less than the average value+n×sigma obtained in step ST101. Here, n is three in this embodiment.

Upon determination that the maximum value is not less than the aforementioned value (ST102: NO), the MPU 14 moves the slider 301 to another track (ST103) and then repeats the processing of steps ST101 and ST102. Thereby, it is possible to exclude an evaluation-precluded LPF output such as the LPF output or the like of a track on which a defect exists. On the other hand, upon determination that the maximum value is less than the aforementioned value (ST102: YES), the MPU 14 makes the threshold TH m (m: natural number)×sigma (ST104). Here, m is six in this embodiment. By obtaining the threshold TH in this way, it becomes possible for the MPU 14 to set the threshold TH (of scratch) in the threshold storage section 162 of the memory 16.

Next, the MPU 14 moves the slider 301 to a track K (ST105). In this embodiment, the MPU 14 moves the slider 301 to the first track of tracks to be inspected. Then, the MPU 14 determines whether or not the largest track and inspection track to be inspected coincide with each other (ST 106). That is, it is determined whether or not inspections of all the tracks of the magnetic disk 2 are completed. Upon determination that the largest track and inspection track coincide with each other (ST106: YES), the MPU 14 terminates the processing.

On the other hand, upon determination that the largest track and inspection track do not coincide with each other (ST106: NO), the MPU 14 determines whether or not a defect exists on the track concerned (ST107). Upon determination that a defect exists thereon (ST107: YES), the MPU stores the defect position (ST108). More specifically, the MPU 14 determines in units of tracks whether or not the LPF output of the processing section 110 of the first system exceeds the threshold TH by using the already-described inspection circuit 100 and, when the LPF output exceeds the threshold TH, the MPU 14 stores the track concerned in the defect position storage section 161 of the memory 16 as a track on which a defect exists.

Then, after the processing of step ST108 is completed or when it is determined in step ST107 that no defect exists (ST107: NO), the processing is returned to step ST105, then the MPU 14 moves the slider 301 to the track K, i.e., in this embodiment, the MPU 14 moves the slider 301 toward the downstream side by one track, and executes the processing of already-described steps ST107 and ST108.

According to the magnetic disk device 1 configured as described above, in the case where a defect on the recording surface 2A of the magnetic disk 2 is inspected by using the processing section 110 of the first system and processing section 120 of the second system on the basis of the output value output from the gap sensor S, the threshold TH (for scratch) defined on the basis of the outputs (LPF outputs) of the processing section 110 of the first system at a plurality of tracks excluding the track which is the inspection object, and output (LPF output) of the processing section 110 of the first system at the track which is the inspection object are compared with each other and, when the LPF output of the track which is the inspection object exceeds the threshold TH, it is possible to detect that there is a defect on the track concerned of the magnetic disk 2. Accordingly, it is possible for the magnetic disk device 1 to accurately detect a defect (groove constituted of depressed parts 2C) along a track on the magnetic disk 2.

Further, the magnetic disk device 1 stores the detected defect position (track) in the defect position storage section 161 of the memory 16, whereby it becomes possible to format the storage area while excluding the defect position concerned after shipment.

Furthermore, the magnetic disk device 1 can store the threshold TH in the threshold storage section 162. Accordingly, after shipment of the magnetic disk device 1, the magnetic disk device 1 can carry out an inspection of a defect of the magnetic disk 2 by utilizing the threshold TH concerned at predetermined timing. As described above, when an inspection is carried out after shipment and a defect of the magnetic disk 2 is newly detected, by storing the position at which the defect concerned is detected in the defect position storage section 161, it becomes possible for the magnetic disk device 1 to update the defect position storage section 161 and exclude the defect position concerned from the storage area.

It should be noted that although in the embodiment described above, descriptions have been given of the case where the defect is a groove constituted of depressed parts 2C in the circumferential direction, the objective defect is not limited to this. For example, even in the case where the defect is a burr constituted of protruding parts 2B in the circumferential direction, this case of the burr differs from the case of the groove in only the level of the LPF output to be output from the processing section 110 of the first system, and hence by obtaining the threshold corresponding to the protruding parts 2B in the same manner, and adding (providing) a processing section configured to determine whether or not the LPF output is less than the threshold, it becomes possible for the magnetic disk device 1 to detect protruding parts 2B (for example, a burr) in the circumferential direction, and determine a track on which the protruding parts 2B exist as a track on which a defect exists.

Second Embodiment

A second embodiment differs from the first embodiment in that a defect of the magnetic disk 2 is detected not in units of tracks, and a defect of the magnetic disk 2 is detected in units of sectors. Accordingly, the configuration and processing in which a defect is detected in units of sectors will be described below in detail. It should be noted that configurations identical to the first embodiment are denoted by reference symbols identical to the first embodiment and detailed descriptions of these configurations are omitted.

When a defect of the magnetic disk 2 is a defect such as a groove constituted of depressed parts 2C in the circumferential direction of a track, there is a case where the length of the groove is finite. For example, when a track is constituted of a plurality of sectors, a case where a defect stays within one sector is also conceivable. In this case, when the LPF outputs inside one track are averaged, the output level becomes low, and hence the detection sensitivity becomes low, and a situation in which it becomes impossible to detect the existence of a defect can also be assumed. Accordingly, in this embodiment, in the magnetic disk device 1, the LPF output is held in units of sectors, the threshold TH is defined in units of sectors similarly to the case of the first embodiment, and the threshold and LPF output of each sector are compared with each other, whereby it is made possible to detect a short defect in the circumferential direction.

Figure 16:
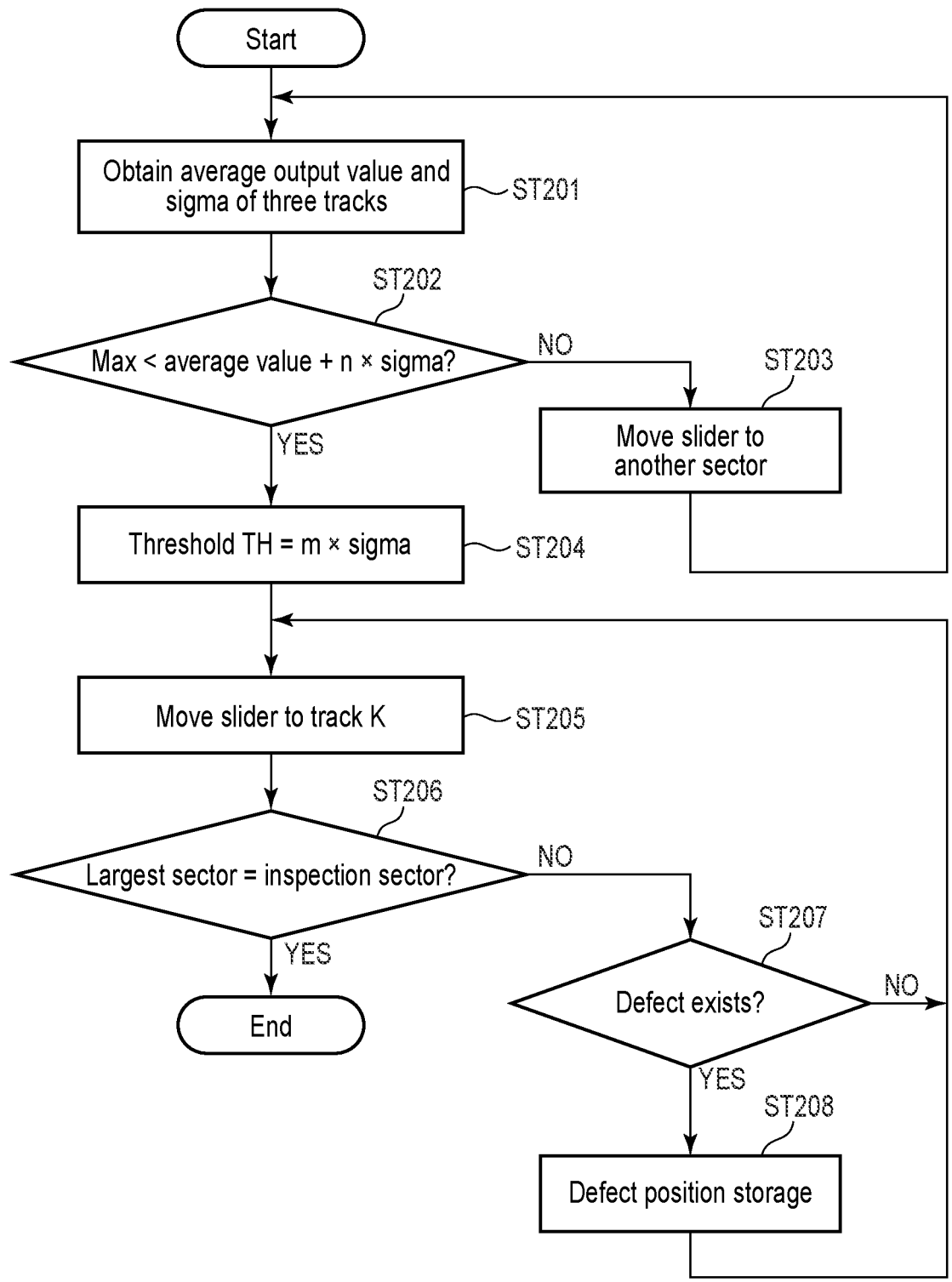
FIG. 16 is a flowchart showing an example of processing of determining a defect according to a second embodiment.

FIG. 16 is a flowchart showing an example of processing of determining a defect. It should be noted that the processing of determining a defect according to this embodiment and processing of determining a defect according to the first embodiments are identical to each other except that while the processing of steps ST201 to ST204 is carried out in units of sectors, processing of steps ST101 to ST104 is carried out in units of tracks, and hence the description of the processing of steps ST201 to ST204 is omitted, and the processing from step ST205 will be described. Further, although in this embodiment, the case where the threshold is defined on the basis of three sectors is described, in the processing carried out in units of sectors, the obtained LPF output is short, and hence it is also conceivable that an appropriate threshold TH cannot be defined due to occurrence of noise. Accordingly, for example, the MPU 14 may define the threshold by using the LPF outputs of all the sectors of the three tracks. Thereby, it becomes possible to define a threshold TH unsusceptible to the influence of noise even when a defect is inspected in units of sectors.

In step ST205, the MPU moves the slider 301 to the track K. In this embodiment, the MPU 14 moves the slider 301 to a track to be inspected for the first time. Then, the MPU 14 determines whether or not the largest sector and inspection sector coincide with each other (ST206). That is, it is determined whether or not inspections of sectors included in all the tracks of the magnetic disk 2 are completed. Upon determination that the largest sector and inspection sector coincide with each other (ST206: YES), the MPU 14 terminates this processing.

On the other hand, upon determination that the largest sector and inspection sector do not coincide with each other (ST206: NO), the MPU 14 determines whether or not a defect exists with respect to each sector of the track concerned (ST207) and, upon determination that a defect exists (ST207: YES), the MPU 14 stores the defect position (ST208). More specifically, the MPU 14 determines in units of sectors whether or not the LPF output exceeds the threshold TH by using the already-described inspection circuit 100 and, when the LPF output exceeds the threshold TH, stores the sector concerned in the defect position storage section 161 of the memory 16 as a sector in which a defect exists (ST208).

Then, after the processing of step ST208 is terminated or when it is determined in step ST207 that no defect exists (ST207: NO), the processing is returned to step ST205, the MPU 14 moves the slider 301 to the track K, in this case, the MPU 14 moves the slider 301 toward the downstream side by one track to thereby execute the already-described processing of steps ST206 to ST208.

Figure 17:
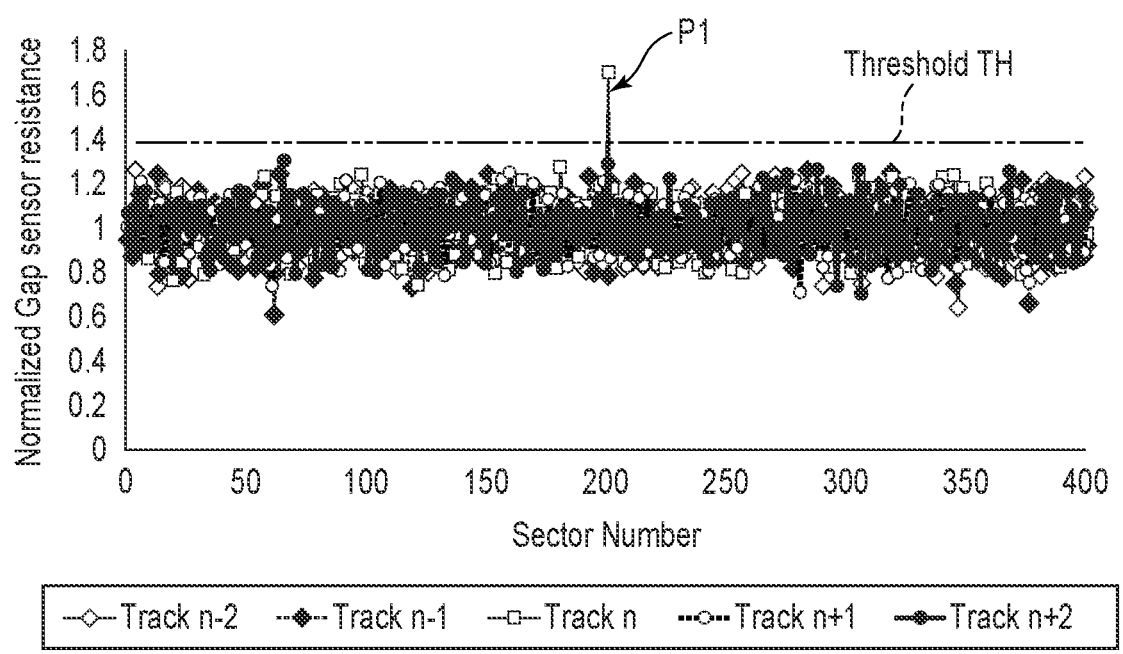
FIG. 17 is a view showing an example of an inspection result according to the second embodiment.

FIG. 17 is a view showing an example of an inspection result. The axis of ordinate indicates the normalized resistance value of the gap sensor S, and axis of abscissa indicates the sector number. As shown in FIG. 17, the threshold TH is exceeded by the resistance value corresponding to the sector number m of the track n (in FIG. 17, the sector number 200 indicated by the reference symbol P1) by the difference between them.

FIG. 18 is a view showing an example of information 200 to be stored in the defect position storage section 161 on the basis of the inspection result of FIG. 17. As shown in FIG. 18, the inspection results of the sectors are shown in units of tracks. In this embodiment, it is shown that a defect exists in the sector m of the track n according to the inspection result of FIG. 17.

From FIG. 17 and FIG. 18, it can be seen that in the magnetic disk 2, no defect exists in the sector m−1 and sector m+1, and defect exists in the sector m of the track n, and hence the defect concerned is a groove constituted of short depressed parts 2C in the sector concerned in the circumferential direction.

As described above, even when the units in which the magnetic disk device 1 carries out inspection are changed to units of sectors, an advantageous effect identical to the first embodiment can be exhibited.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A magnetic disk inspection method of
a magnetic disk device including
a magnetic disk,
a slider including a read head configured to read data from the magnetic disk, a write head configured to write data to the magnetic disk, a thermal actuator configured to adjust a gap between the read head or the write head and the magnetic disk, and a gap sensor configured to detect the gap, a preamplifier including a first processing section including a first filter configured to filter an output of the gap sensor at a predetermined frequency, and a second processing section including a second filter configured to filter the output of the gap sensor at a frequency higher than the frequency of the first filter, and a control section configured to control read/write of the slider from/to the magnetic disk, comprising:

when an inspection of a defect of a recording surface of the magnetic disk is carried out by using the first processing section and the second processing section on the basis of the output of the gap sensor, comparing a threshold defined on the basis of outputs of the first processing section at a plurality of tracks excluding a track which is an inspection object and an output of the first processing section at the track which is the inspection object with each other; and when the output of the first processing section at the track which is the inspection object exceeds the threshold, detecting that there is a defect on the track concerned of the magnetic disk.

2. The magnetic disk inspection method of a magnetic disk device of claim 1, wherein
the plurality of tracks defining the threshold are tracks on the upstream side of the track which is the inspection object.

3. The magnetic disk inspection method of a magnetic disk device of claim 1, wherein
an interval greater than or equal to a track is provided between the aggregate of the plurality of tracks defining the threshold and the track which is the inspection object.

4. The magnetic disk inspection method of a magnetic disk device of claim 1, wherein
the defect is a depressed part in the circumferential direction of the track.

5. The magnetic disk inspection method of a magnetic disk device of claim 1, further comprising,
when it is detected that there is the defect,
storing a position of the track on which the existence of the defect is detected.

6. The magnetic disk inspection method of a magnetic disk device of claim 5, wherein
an output of the first processing section at the track on which the existence of the defect is detected, the output being filtered by the first processing section, is excluded from the plurality of tracks defining the threshold.

7. The magnetic disk inspection method of a magnetic disk device of claim 1, wherein
the track is constituted of a plurality of sectors,
when a defect of a recording surface of the magnetic disk is inspected by using the first processing section and the second processing section on the basis of the output of the gap sensor,
the comparison is carried out in units of sectors included in the track, and
when the output of the first processing section at the sector which is the inspection object exceeds the threshold, it is determined that there is a defect in the sector concerned of the magnetic disk.

8. The magnetic disk inspection method of a magnetic disk device of claim 7, wherein
when furthermore it is detected that there is the defect, a position of the sector at which the defect is detected is stored.

9. A magnetic disk device comprising:
a magnetic disk;
a slider including a read head configured to read data from the magnetic disk, a write head configured to write data to the magnetic disk, a thermal actuator configured to adjust a gap between the read head or the write head and the magnetic disk, and a gap sensor configured to detect the gap;
a preamplifier including a first processing section including a first filter configured to filter an output of the gap sensor at a predetermined frequency, and a second processing section including a second filter configured to filter the output of the gap sensor at a frequency higher than the frequency of the first filter; and
a control section configured to control read/write of the slider from/to the magnetic disk, wherein
when an inspection of a defect of a recording surface of the magnetic disk is carried out by using the first processing section and the second processing section on the basis of the output of the gap sensor,
the preamplifier includes
an inspection section configured to compare a threshold defined on the basis of outputs of the first processing section at a plurality of tracks excluding a track which is an inspection object and an output of the first processing section at the track which is the inspection object with each other, and
when the output of the first processing section at the track which is the inspection object exceeds the threshold, detect that there is a defect on the track concerned of the magnetic disk.

* * * * *